Figure 1:
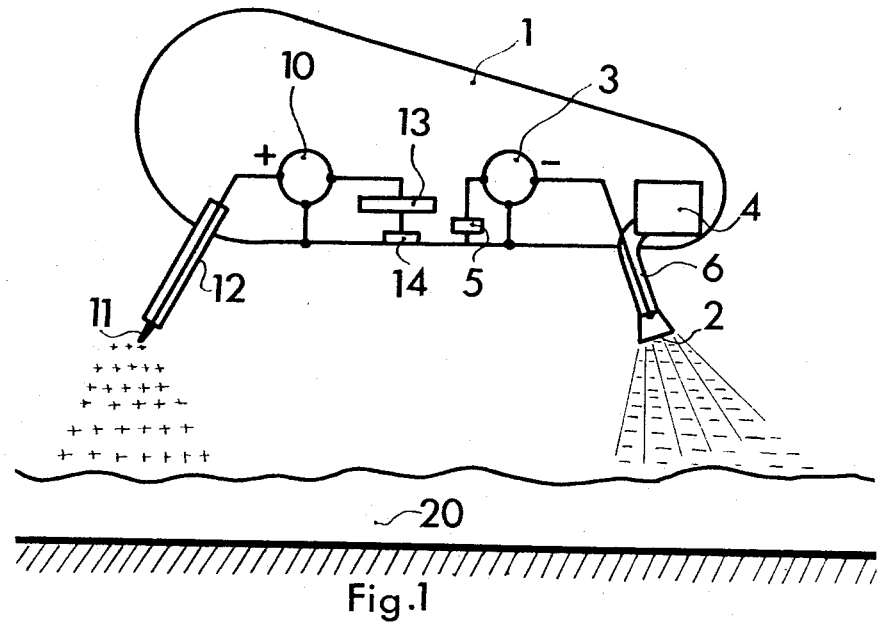

Jan. 10, 1967  N. J. O. J. FELICI  3,297,281
METHOD AND MEANS FOR CONTROLLING THE ELECTRIC
POTENTIAL OF AIRCRAFT IN FLIGHT AND
APPLICATIONS TO THE ELECTROSTATIC
SPRAY TREATMENT OF VEGETATION
Filed Dec. 28, 1964

2 Sheets-Sheet 1

Inventor
N. J. O. J. FELICI
By
Holcombe, Wetherill & Brisebois
Attorneys 3,297,281
METHOD AND MEANS FOR CONTROLLING THE ELECTRIC POTENTIAL OF AIRCRAFT IN FLIGHT AND APPLICATIONS TO THE ELECTROSTATIC SPRAY TREATMENT OF VEGETATION
Noel Jean Olivier Joseph Felici, 13 rue Charles Peguy, Grenoble (Isere), France
Filed Dec. 28, 1964, Ser. No. 421,337
Claims priority, application France, Jan. 9, 1964, 4,640, Patent No. 1,390,315
11 Claims. (Cl. 244—136)

A primary object of this invention is to provide improved method and means whereby the electric potential which the body of a flying aircraft tends to assume due to various atmospheric and other causes, can be controlled more positively and reliably than was heretofore possible.

A more specific and extremely important object of the invention is to provide such method and means for use on low-flying aircraft from which a spray of treating agent is being discharged over underlying vegetation. Such sprays of treating agent may comprise solid or liquid particles and may serve such purposes as pest destruction, plant hormone treatment and the like.

In recent years the spray treatment of large expanses of vegetation, particularly farming crops, has frequently been carreid out from aircraft, including both aeroplanes and helicopters, flying over the areas to be treated at low altitude. The use of aircraft has made it economically feasible to spray-treat areas which it would be quite impracticable to treat otherwise in view of the great amount of time and/or labour which would be required.

Also in recent years, the spray-treatment of crops has been subject to another important development. This lies in discharging the divided treating substance in an electrically charged state and creating a high electrostatic field between the point of discharge and the plants to be treated (which are at ground potential), so that the particles of the substance are conveyed onto the plant surfaces over the lines of force of the field, thereby ensuring greater uniformity in the distribution of the treating substances through mutual repulsion between the particles and a positive bond between the particles and the plant surfaces through electrostatic attraction, as a result of which the active agent is retained for longer periods of time in active contact with the plants despite wind and rain.

It would be attractive, and seemingly simple, to combine the two methods and thus secure the inherent advantages of both. In point of fact, however, attempts to treat crops with electrostatically charged divided substances from aboard aircraft have met with insuperable difficulties and have had to be abandoned. The problem lies fundamentally in the absence of any electrical connection between the body of the aircraft and ground, so that the emission of the electrically charged particles from the craft results in a rapid increase of the electrical potential of the body of the craft in proportion to the total amount of electric charge carried by the emitted particles, thus bringing the body of the craft to extremely high potentials (opposite in sign to that of the charges imparted to the particles). This situation has grave consequences. During the spraying operation, the outer surfaces of the aircraft, being at a high potential opposite in sign from that of the particles, create a strong disturbing field which tends to attract the emitted paricles towards said aircraft surfaces rather than allowing them to be attracted towards the plant surfaces. The spraying operation is thus seriously impaired or made impossible.

Another grave difficulty resulting from the high potential to which the aircraft would be carried, is the fact that on landing, the stored electrical energy would tend to be immediately released in a sudden and powerful discharge which would endanger the lives of the personnel in the absence of elaborate precautionary measures.

In the prior arts of aircraft construction and flying, it has been known to provide means for reducing or limiting the electric potential which any flying aircraft normally tends to assume, even in the absence of any electrostatic spray discharged from it, due simply to the normal atmospheric voltage gradient air friction, and electric storm conditions surrounding the flying craft. These prior means have taken the form of long projecting point electrodes, particularly wires trailing from the aircraft, and acting to create a discharge through which the craft potential is able to leak off at a limited rate to the atmosphere.

These conventional aircraft charge-limiting means have been found to be completely inadequate for the purposes of permitting electrostatic spray treatment from aboard aircraft. With such devices the rate of leakage of electricity from the craft to atmosphere is extremely low, only assuming an appreciable value after the potential of the aircraft body has reached a high level well beyond the potential level at which the objectionable effects of the above-mentioned disturbing field impairing normal electrostatic spraying operations has been attained. Moreover, due to the very low altitudes at which the craft must be flown for spray treatments, the trailing of long wires from aboard the craft is prohibited.

Objects of this invention include both the provision of improved method and means for controlling the electric potential assumed by a flying aircraft, and the provision of a method and system for the spray treatment of large expanses of vegetation with liquid or solid divided treating substances in an electrically charged state, from aircraft.

The invention, in an important aspect, is for the method of controlling the electric potential of an aircraft in flight, which comprises emitting ions from aboard the aircraft at a controllable rate, sensing the strength of the electric field in the atmosphere adjacent the aircraft, and controlling the rate of ion emission in response to the strength of the field thus sensed.

In an important aspect, the invention is directed to the method of overhead spray treatment, which comprises emitting from at least one first point of a flying aircraft a finely divided treating substance, imparting an electric charge of a predetermined polarity to the particles of the substance as they are emitted, simultaneously emitting from at least one second point of the aircraft spaced from the first point, ions charged to the opposite polarity at a controllable rate, and controlling the rate of ion emission in such relation to the rate of emission of the charged particles as to maintain the potential of the aircraft body at a prescribed level.

Figure 2:
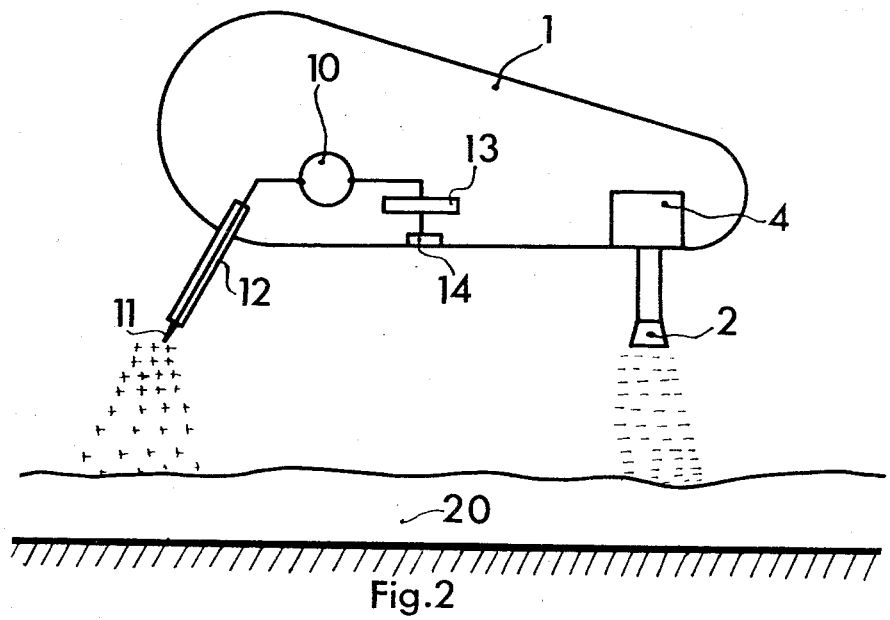
Figure 3:
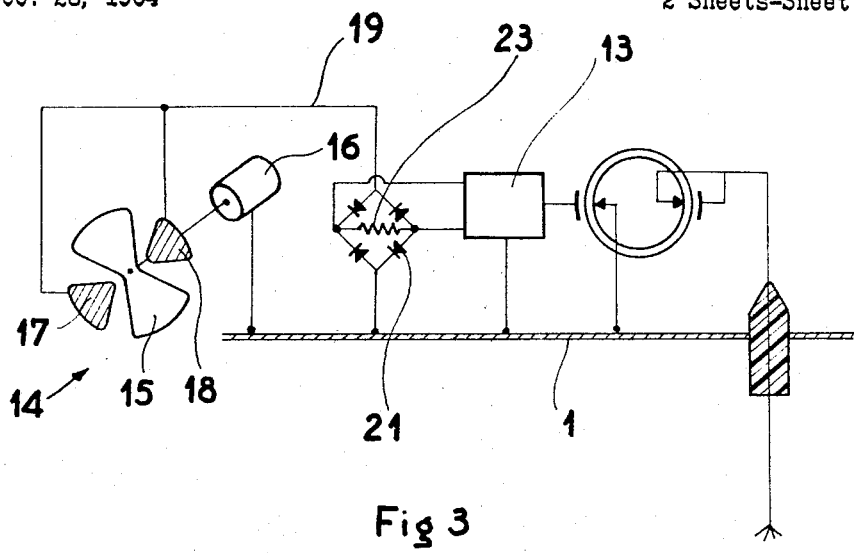
Figure 4:
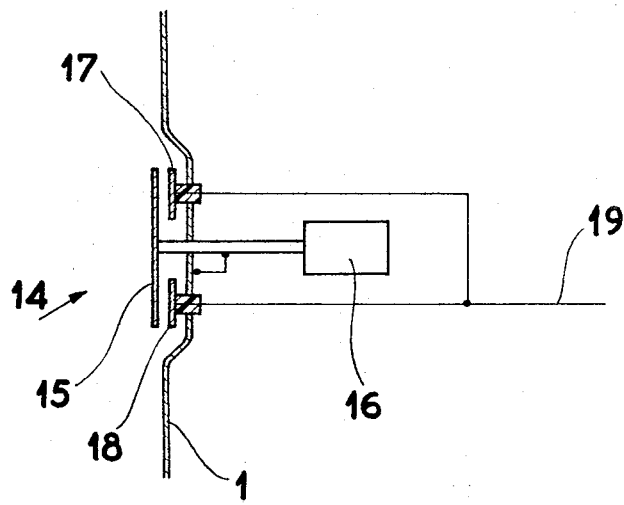

The various objects and patentable features of the invention will be made clear from the ensuing description of two specific embodiments selected by way of illustration but not of limitation, and illustrated in the accompanying drawings wherein:

FIG. 1 is a schematic side view illustrating a first embodiment of the invention;

FIG. 2 similarly illustrates a second embodiment;

FIGS. 3 and 4 are end perspective view and sectional view respectively of a part of FIG. 1 or 2.

Schematically shown in FIG. 1 is the fuselage 1 of an aircraft flying at low altitude over vegetation 20, such as crops to be spray-treated with a pesticidal substance. The aircraft 1 may be an aeroplane or a helicopter or in fact any other man-made device capable of controlled flight through the atmosphere, and the term aircraft as used in the specification and claims is to be interpreted with this broad meaning.

The treating susbtance, which may be a liquid composition, an oily suspension or a solid powder substance, is carried in a store 4 shown supported near the rear end of the aircraft body 1. Means are provided for discharging the substance from the store 4 in a generally downward direction from the aircraft through an insulated conduit 6 terminating in a suitable spray nozzle 2. The spray nozzle 2, as well as the means, not shown in detail, serving to feed the substance from store 4 for discharge in finely divided form from the nozzle, may assume any of various well-known forms as conventionally used in the spray treatment of crops with earth-bound systems, such for example as the means disclosed in the application No. 338,251.

Means are provided for imparting an electric charge of determined polarity to the particles of substance as they issue from the spray nozzle 2. As shown schematically, the means comprise an electrostatic generator 3 of the cylindrical charge-carrier type. Generator 3 which is suitably supported in the aircraft body 1 has associated with it a conventional variable-excitation and regulator unit schematically indicated at 5, and has a terminal connected to the body of the aircraft 1 and another, output, terminal which delivers in operation a high direct voltage of the order e.g. of 100 kilovolts, herein negative as indicated by the minus sign. This output terminal is connected by an insulated lead 22 to the spray nozzle 2, which may be of conductive material, or to a suitable ionizing electrode associated with said nozzle.

With the arrangement so far described, when the aircraft 1 is flying at low altitude over crops 20 to be spray-treated, the divided treating substance from store 4 can be sprayed out and down through nozzle 2 as a cloud or mist indicated at 24, and the particles in the cloud as they issue through nozzle 2 are charged with a high negative potential applied thereto from the output terminal of generator 3. Were this to be attempted, however, it would be found that the aircraft body 1 would rapidly be charged to a high positive potential proportionate with the amount of electric charge carried away from the craft with the particles of substance 24.

To provide a typical numerical example of the situation that would arise, it may be assumed that the aircraft has a capacitance relative to ground of 200 picofarads and that the rate of delivery of the spray 24 from the aircraft and the value of electric charge applied thereto from generator 3 are such as to provide an effective electric current of 10 microamps issuing from the aircraft into the atmosphere. It can be shown that in these conditions the potential of aircraft body 1 relative to ground will rise at a rate of about 50,000 volts per second. This would lead to an unacceptable situation from the very onset of the spraying process. Thus the negatively charged particles 24 on issuing from nozzle 2 would immediately be deflected upwards over the lines of force of the parasitic field set up between the nozzle 2 and the outer surfaces of the aircraft body 1 and would be attracted towards the aircraft instead of drifting to the ground along the downward lines of force of the main or desired field present between the spray nozzle and the ground vegetation 20 to be treated therewith. In addition, when the aircraft would subsequently land, the electrical energy stored in the aircraft including its occupants would be suddenly released in an extremely dangerous discharge.

The above difficulties are completely eliminated in accordance with this invention through the provision of means for controlling the potential level of aircraft body 1 at all times during flight, as will now be described. At one or more points spaced from the spray nozzle 2, and as here shown at a point located near the nose of the aircraft, there is provided an ionizing electrode 11 which protrudes from the aircraft preferably in a downward direction diverging from the spray nozzle 2 as shown, and by a distance as long as possible, so that it creates no danger whatever of fouling external obstacles. The ionizing electrode 11 may be in the form of a simple sharp-tipped metallic rod, and extends through a tube 12 of non-conductive material so as to be insulated from the body 1. Electrode 11 is connected at its inner end with the output terminal, marked with the plus sign, of a second high-voltage electrostatic generator 10 which may be similar to generator 3.

The generator 10 is adapted to deliver at its output terminal a direct voltage of a continuously variable magnitude, as controlled through a variable-gain excitation unit 13 from a control device 14 which senses the strength of the electric field present in the atmosphere immediately outside the aircraft body 1. The device 14 may be any suitable field-responsive device, e.g. of the rotary voltmeter or vibratory electrometer type, which is capable of delivering a voltage signal, e.g. an alternating voltage signal, of an amplitude proportional to the intensity of the electric field or voltage gradient sensed by the device. The variable-voltage signal delivered by field-responsive device 14 is applied to the variable-excitation unit 13 so as to vary the gain thereof, and hence the excitation voltage applied to generator 10, so that the generator delivers at its positive output terminal connected to ionizing electrode 11, a high positive D.C. voltage, the variations of which are proportionate with, but amplified with respect to, the variations of the electric field in the atmosphere surrounding the aircraft as sensed by field-senser device 14. The ionizing electrode 11 will then produce a discharge into the surrounding atmosphere of a stream of ions the total electric charge of which will vary in proportion with, but at an amplified rate with respect to the variations in the electric field surrounding the craft. For example, when the field-sensing device 14 senses an increase in the electric field of say 1000 volts with respect to the ground, the voltage applied from the output from generator 10 to ionizer 11 may increase, say, 50,000 volts, thereby correspondingly increasing the rate of ionic discharge from the ionizer electrode 11.

In this manner, the rate of discharge of electricity, i.e. the ionization current, from the electrode 11 can be made to compensate continuously the rate of discharge of electricity or current emitted from the nozzle 2 in the form of the charged particles of treating material. It will be evident that in this way the electrical potential of the aircraft body 1 with respect to the ground can at all times be maintained at a prescribed, e.g. constant, level. Since the rate of discharge of air ions from the ionizer electrode 11 is made to depend on the strength of the electric field in the immediate vicinity of the aircraft body 1, the above operation will proceed satisfactorily regardless of the altitude of the aircraft above the ground.

It will also be evident that through a suitable adjustment or calibration or the field-sensing device 14 and/or the variable-gain excitation unit 13, matters can be so arranged that the effective potential of the aircraft body 1 will at all times retain a substantially constant level that is slightly negative with respect to the ground. This will positively ensure that the spray emitted from the nozzle 2 will not tend to be attracted towards the outer surfaces of aircraft body 1 but will proceed as required on its downward path along the lines of force of the main electrostatic field created between nozzle 2 and the vegetation 20.

In the modified embodiment shown in FIG. 2, the ion-discharge system of the invention serves per se to create the main electrostatic field between the aircraft and the ground, whereby the system can include a single high-voltage generator as shown, 10, generator 3 of FIG. 1 being omitted.

Parts in FIG. 2 corresponding to parts in FIG. 1 are designated by the same reference numerals and will not further be described. As shown, the spray nozzle 2 may be electrically connected directly with the skin of the aircraft body 1. The variable-gain excitation device 13 associated with the variable ionization-voltage generator 10 is again responsive to the strength of the field sensed by field senser device 14, so as to cause ionizer electrode 11 to emit atmospheric ions at a rate proportionate with the discharge of the particles of treating material emitted by nozzle 2. However, the unit 13 (and/or device 14) is here adjusted in such a way that the ion discharge from electrode 11 holds the potential of the aircraft body 1 at a prescribed high negative voltage level with respect to the ground, such level being selected sufficiently high to ensure that the requisite electrostatic field or voltage gradient is continuously present between the aircraft and the ground, and that the particles of treating material are charged to the requisite high negative potential and will thus be guided along the lines of force of said field towards the vegetation 20 to be treated.

According to FIGURES 3 and 4, the electric field at the bottom of the aircraft, the strength of which must be kept below a predetermined value, in order to prevent back attraction of the sprayed powder and corresponding waste thereof, is permanently monitored by a rotating electrostatic voltmeter 14, which comprises a sector shaped rotor 15, driven by a constant speed motor 16, and two stationary, insulated sectors 17, 18, that are periodically screened off against the outer space by the rotor. Should the aircraft be electrified, the electric flux originating from the stationary sectors 17, 18, will be periodically shorn by the rotor 15 thereby depriving them of their electric charge, which must flow through a connecting wire 19 to the aircraft body, in order to reach ultimately the rotor surface. The electric charge thus oscillates back and forth along wire 19, creating an alternating current the intensity of which is proportional to the electric flux shorn by the rotor, id est to the electric field.

The A.C. from the electrostatic voltmeter 14 is rectified by means of a low voltage rectifier 21 and the D.C. flows through a calibrated resistor 23 thereby creating a D.C. voltage signal proportional to the electric field at the bottom of the aircraft. This signal is fed to a D.C. amplifier forming the variable-excitation unit above referred 13 which actuates the excitation of the electrostatic generator 10 which supplies the insulated ionizing points 11 fitted to the tail of the aircraft with high voltage D.C. The amplifier and the electrostatic generator are arranged in order to give the points the polarity of the electrical charge of the aircraft itself.

Since the points are substantially projecting beneath the bottom of the aircraft, and are brought to a high voltage with respect to its body, they are very effective in creating a spray of ions of the like sign, part of which will travel to the ground and will relieve the aircraft from a corresponding amount of static electricity, since the aircraft and the attached electrical equipment are an insulated electrical system.

Various other modifications may be introduced without exceeding the scope of the invention. It will be evident that the invention is useful also in the absence of any spray discharge from the aircraft, whenever it is desired to limit or otherwise control the potential which any flying body tends naturally to assume in the atmosphere.

What is claimed is:

1. In an aircraft, the combination comprising a store of sprayable treating agent carried by the aircraft, sprayer means connected to the store and projecting from the aircraft at at least one first point thereof for emitting said agent in divided form from the aircraft including means for applying electric charges of one polarity to the particles of said agent as they are emitted, ionizing means projecting from the aircraft at at least one second point spaced from said first point, means for applying a variable D.C. voltage to the ionizing means of a polarity opposite from said one polarity, and means for controlling said variable voltage so as to vary the rate of ion emission from said ionizing means to maintain the aircraft potential at a prescribed level through the emission of said charged particles of treating agent.

2. In an aircraft, the combination defined in claim 1 including means responsive to the strength of the electrostatic field adjacent the craft, and connected to said voltage controlling means for varying said voltage in proportion to said field.

3. In an aircraft, the combination comprising a store of treating agent carried by the aircraft, sprayer means connected to the store and projecting from the aircraft at at least one first point thereof including means for emitting said agent in finely divided particle form from the aircraft, ionizing means projecting from the aircraft at at least one second point spaced from the first, and high-voltage electric generator means having terminals of opposite denomination connected to said sprayer means and to said ionizing means for simultaneously applying charges of one sign to said agent particles and causing emission of ions of opposite sign by said ionizing means whereby to maintain the potential of the aircraft at a controlled level.

4. In an aircraft, the combination comprising a store of sprayable treating agent carried on the craft, sprayer means connected to the store and projecting from the craft at at least one first point thereof for emitting said agent in divided particle form from the aircraft, ionizing electrode means projecting from the craft at at least one second point spaced from the first, a first high-voltage electric generator having an output terminal connected to said sprayer means for applying charges of one sign to said agent particles, a second high-voltage electric generator having an output terminal connected to said electrode means for causing emission of ions of opposite sign by said electrode means, variable excitation means connected to an input terminal of the second generator, and means for controlling said variable excitation means to vary the rate of ion emission so as to maintain the aircraft potential at a prescribed level during emission of said treating agent.

5. The combination claimed in claim 4, wherein said excitation controlling means comprises means responsive to the electrostatic field in the atmosphere adjacent the craft.

6. In an aircraft, the combination comprising a store of sprayable treating agent carried by the craft, sprayer means connected to the store and projecting from the craft at at least one first point thereof for emitting said agent in fine particle form from the craft, ionizing electrode means projecting from the craft at a second point spaced from the first point, a high-voltage electric generator having an output terminal connected to said ionizing electrode means for causing emission of ions of one sign therefrom, whereby said treating agent particles will assume charges of the opposite sign prior to being emitted from the craft, variable excitation means connected to an input terminal of said generator, and means for controlling said excitation means for controlling the voltage of said output terminal at a prescribed high level.

7. The combination claimed in claim 6, including means responsive to the electrostatic field in the atmosphere adjacent the craft and connected to said excitation controlling means.

8. The mehod of treating ground surfaces from a low-flying aircraft, comprising the steps of emitting an electrically charged spray of treating agent from one point of the craft, whereby said spray will be electrostatically guided and attracted to underlying ground surfaces, and concurrently emitting from another point of the craft spaced from the first point ions having an electric charge of opposite sign to that of the spray, so as to maintain the potential of the craft at prescribed level.

9. The method of treating ground surfaces from a low-flying aircraft, comprising the steps of emitting spray of treating agent from one point of the craft, and concurrently emitting ions from another point of the craft spaced from the first point, whereby the spray will tend to assume an electric charge of a sign opposite to that of said ions and will be electrostatically attracted to underlying ground surfaces.

10. The method of claim 8, including the step of varying the rate of ion emission so as to maintain the craft potential at a moderate level of the same polarity as that of the spray to prevent attracting the spray back to the aircraft.

11. The method of claim 8, including the step of sensing the electrostatic field in the atmosphere adjacent the craft, and varying the rate of ion emission in response to variations in the sensed field.

References Cited by the Examiner

UNITED STATES PATENTS

| | | | |
|---|---|---|---|
| 1,928,963 | 10/1933 | Chaffee | 239—2 |
| 2,408,774 | 10/1946 | Goodard et al. | 244—136 X |
| 3,095,163 | 6/1963 | Hill | 244—62 X |
| 3,095,167 | 6/1963 | Dudley | 244—62 |

MILTON BUCHLER, *Primary Examiner.*

FERGUS S. MIDDLETON, *Examiner.*

L. C. HALL, B. BELKIN, *Assistant Examiners.*